US009788051B2

(12) United States Patent
Kwon

(10) Patent No.: US 9,788,051 B2
(45) Date of Patent: Oct. 10, 2017

(54) DEVICE AND METHOD FOR TRANSMITTING AND RECEIVING VIDEO DATA

(71) Applicant: SAMSUNG ELECTRONICS CO., LTD., Suwon-si, Gyeonggi-do (KR)

(72) Inventor: Jae-un Kwon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/938,278

(22) Filed: Nov. 11, 2015

(65) Prior Publication Data

US 2016/0191992 A1 Jun. 30, 2016

(30) Foreign Application Priority Data

Dec. 24, 2014 (KR) ........................ 10-2014-0188633

(51) Int. Cl.
| | |
|---|---|
| *H04N 7/16* | (2011.01) |
| *H04N 21/436* | (2011.01) |
| *H04N 21/4367* | (2011.01) |
| *H04N 21/4363* | (2011.01) |
| *H04N 21/475* | (2011.01) |
| *H04N 21/41* | (2011.01) |

(Continued)

(52) U.S. Cl.
CPC ... *H04N 21/43615* (2013.01); *H04N 21/4122* (2013.01); *H04N 21/4126* (2013.01); *H04N 21/4367* (2013.01); *H04N 21/43637* (2013.01); *H04N 21/4622* (2013.01); *H04N 21/4753* (2013.01); *H04N 21/482* (2013.01)

(58) Field of Classification Search
CPC .................. H04N 21/43615; H04N 21/43638
See application file for complete search history.

(56) References Cited

U.S. PATENT DOCUMENTS

| | | | | |
|---|---|---|---|---|
| 2006/0282793 | A1* | 12/2006 | Stephens | G06F 3/0485 |
| | | | | 715/810 |
| 2011/0058042 | A1* | 3/2011 | Ida | G09G 5/006 |
| | | | | 348/159 |

(Continued)

FOREIGN PATENT DOCUMENTS

| | | |
|---|---|---|
| KR | 10-2012-0045628 | 5/2012 |
| KR | 10-2012-0139475 | 12/2012 |
| WO | WO 2010/071269 | 6/2010 |

OTHER PUBLICATIONS

Extended European Search Report mailed Jul. 15, 2016 in counterpart European Patent Application No. 15201267.0.

(Continued)

*Primary Examiner* — Gigi L Dubasky
(74) *Attorney, Agent, or Firm* — Nixon & Vanderhye P.C.

(57) ABSTRACT

A device and method for transmitting/receiving video data is disclosed. A sink device configured to receive video data from a source device includes communication circuitry configured to communicate with the source device; and a controller configured to transmit a probe request frame for detecting the source device, to receive a probe response frame from the source device receiving the probe request frame via the communication circuitry, and to obtain information regarding at least one external input source of the source device from the probe response frame.

8 Claims, 14 Drawing Sheets

(51) Int. Cl.
*H04N 21/482* (2011.01)
*H04N 21/462* (2011.01)

(56) References Cited

U.S. PATENT DOCUMENTS

| | | | | |
|---|---|---|---|---|
| 2011/0265112 | A1* | 10/2011 | Kwak | G09G 5/006 |
| | | | | 725/25 |
| 2012/0319942 | A1 | 12/2012 | Kim et al. | |
| 2013/0185447 | A1* | 7/2013 | Nagawade | H04W 8/005 |
| | | | | 709/228 |
| 2013/0222210 | A1 | 8/2013 | Wang et al. | |
| 2014/0009501 | A1* | 1/2014 | Kim | G09G 5/003 |
| | | | | 345/660 |
| 2014/0184516 | A1 | 7/2014 | Kim et al. | |

OTHER PUBLICATIONS

"Slingbox," Internet Citation, Oct. 21, 2007, XP002512399, pp. 1-5.
EP Application No. 15201267.0 Examination Report dated Mar. 20, 2017.

* cited by examiner

FIG. 11

| Field | Size(octets) | Value (Hexadecimal) | Description |
|---|---|---|---|
| Sub-element ID | 1 | 0xB | Vendor Specific |
| Length | 2 | Variable | |
| Number of Sources | 1 | | |
| Source Names Body Field | Variable (Separated by Separator) | | Separator; comma, Space, etc. |

FIG. 12

| Field | Size(octets) | Value (Hexadecimal) | Description |
|---|---|---|---|
| Element ID | 1 | DD | IEEE 802.11 vendor specific usage |
| Length | 1 | Variable | Length of the following fields in the IE in octets. The length field is variable and set to 4 plus the total Length of WFD subelements. |
| OUI | 3 | 50-6F-9A | WFA Specific OUI |
| OUI Type | 1 | 0A | Identifying the type or version of the WFD IE. Setting to 0x0A indicates WFA WFD v1.0 |
| WFD subelements | Variable | | One or more WFD subelements appear in the WFD IE. |

FIG. 13

| Field | Size(octets) | Value (Hexadecimal) | Description |
|---|---|---|---|
| Sub-element ID | 1 | | Identifying the type or version of the WFD IE. Setting to 0x0A indicates WFA WFD v1.0 |
| Length | 2 | Variable | Length of the following fields in the subelement |
| Sub-elements body field | Variable | | Subelement specific information fields |

FIG. 14

| Sub-element ID (Decimal) | Notes |
| --- | --- |
| 0 | WFD Device Information |
| 1 | Associated BSSID |
| 2 | WFD Audio Formats |
| 3 | WFD Video Formats |
| 4 | WFD 3D Video Formats |
| 5 | WFD Content Protection |
| 6 | Coupled Sink Information |
| 7 | WFD Extended Capability |
| 8 | Local IP Address |
| 9 | WFD Session Information |
| 10 | Alternative MAC Address |
| 11-255 | Reserved |

DEVICE AND METHOD FOR TRANSMITTING AND RECEIVING VIDEO DATA

CROSS-REFERENCE TO RELATED APPLICATION

This application is based on and claims priority under 35 U.S.C. §119 to Korean Patent Application No. 10-2014-0188633, filed on Dec. 24, 2014, in the Korean Intellectual Property Office, the disclosure of which is incorporated by reference herein in its entirety.

BACKGROUND

1. Field

The disclosure relates to methods and devices for transmitting and receiving video data, and for example, to methods and apparatuses for enabling a user to view desired video data more immediately and conveniently when a sink device receives video data from a source device and outputs the video data.

2. Description of Related Art

Wi-Fi Direct is a technology that connects Wi-Fi devices to one another in a peer-to-peer manner even when the Wi-Fi devices do not join a home network, an office network, a hotspot network, etc., unlike the existing Wi-Fi technologies. Wi-Fi Direct has been suggested by the Wi-Fi Alliance.

Wi-Fi Miracast (hereinafter referred to as 'Miracast') is a wireless video transmission standard suggested by the Wi-Fi Alliance, whereby display devices may share a screen with each other using a wireless local area network (LAN) signal, based on Wi-Fi Direct.

Recently, there has been a growing need to develop a more convenient user environment for transmitting/receiving a screen displayed on a display device, such as a television (TV), a smart phone, etc., to/from another display device.

SUMMARY

Methods and apparatuses for enabling a user to more immediately and conveniently view desired video data when a sink device receives video data from a source device and outputs the video data are provided.

Additional aspects will be set forth in part in the detailed description which follows and will be presented by way of examples.

According to an example, a sink device for receiving video data from a source device includes a communication unit or circuitry for communicating with the source device; and a controller configured to transmit a probe request frame for detecting the source device, receiving a probe response frame from the source device receiving the probe request frame via the communication unit or circuitry, and obtaining information regarding at least one external input source of the source device from the probe response frame.

Also, according to an example, the sink device may further include a display for displaying video data, and the controller may be configured to extract the information regarding the at least one external input source from the probe response frame and to display the extracted information regarding the at least one external input source on the display.

Also, the controller may be configured to receive an input for selecting an external input source based on the information regarding the at least one external input source, to establish communication with the source device via the communication unit or circuitry, and to transmit a control signal for receiving video data from the selected external input source to the source device via the communication unit or circuitry.

Also, the information regarding the at least one external input source of the source device may be included in Wi-Fi display (WFD) information elements included in the probe response frame.

Also, according to an example, the sink device may further include a display for displaying video data, and the controller may be configured to display, on the display, a user interface requesting input of authentication information corresponding to the at least one external input source.

Also, according to an example, the sink device may further include a display for displaying video data, and the controller may be configured to display information regarding at least one external input source of the sink device on the display.

According to an example, a source device for providing a sink device with video data includes a communication unit or circuitry for communicating with the sink device; and a controller configured to receive a probe request frame for detecting the source device from the sink device via the communication unit or circuitry, and to transmit a probe response frame to the sink device via the communication unit or circuitry in response to the probe request frame, wherein the probe response frame may include information regarding at least one external input source of the source device.

Also, the controller may be configured to establish communication with the sink device via the communication unit or circuitry, to receive a control signal regarding the at least one external input source of the source device from the sink device, and to transmit video data obtained from the at least one external input source to the sink device via the communication unit or circuitry, based on the control signal.

Also, the information regarding the at least one external input source of the source device may be included in Wi-Fi display (WFD) information elements included in the probe response frame.

According to an example, a method of receiving video data from a source device, performed by a sink device, includes transmitting a probe request frame for detecting the source device; receiving a probe response frame from the source device receiving the probe request frame; and obtaining information regarding at least one external input source of the source device from the probe response frame.

Also, obtaining the information regarding the at least one external input source may include extracting the information regarding the at least one external input source from the probe response frame; and displaying the extracted information regarding the at least one external input source.

According to an example, the method may further include receiving an input for selecting an external input source based on the displayed information regarding the at least one external input source; establishing communication with the source device; and transmitting a control signal for receiving video data from the selected external input source to the source device.

Also, according to an example, the information regarding the at least one external input source of the source device may be included in Wi-Fi display (WFD) information elements included in the probe response frame.

Also, according to an example, the method may further include displaying a user interface requesting input of authentication information corresponding to the at least one external input source.

Also, according to an example, the method may further include displaying information regarding at least one external input source of the sink device.

According to an example, a method of providing video data to a sink device, performed by a source device, includes receiving a probe request frame for detecting the source device; and transmitting a probe response frame to the sink device in response to the probe request frame, wherein the probe response frame includes information regarding at least one external input source of the source device.

Also, according to an example, the method may further include establishing communication with the sink device; receiving a control signal regarding the at least one external input source of the source device from the sink device; and transmitting video data obtained from the at least one external input source to the sink device, based on the control signal regarding the at least one external input source.

Also, the information regarding the at least one external input source of the source device may be included in Wi-Fi display (WFD) information elements included in the probe response frame.

BRIEF DESCRIPTION OF THE DRAWINGS

These and/or other aspects and advantages will become apparent from the following detailed description, taken in conjunction with the accompanying drawings in which like reference numerals refer to like elements, and wherein:

FIG. 11 illustrates an example format of Wi-Fi Display (WFD) sub-elements containing information regarding external input sources;

FIG. 12 illustrates an example format of WFD information elements (IEs);

FIG. 13 illustrates an example format of WFD sub-elements; and

FIG. 14 is a table illustrating an example WFD sub-element identification (ID).

DETAILED DESCRIPTION

Figure 1A:
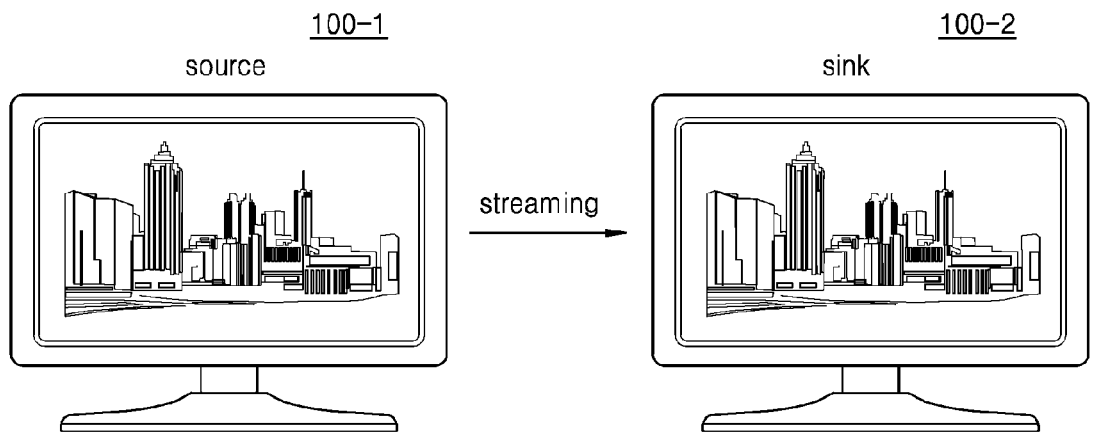
FIGS. 1A and 1B are diagrams illustrating an example of communication established between a sink device and a source device.

Reference will now be made in detail to examples which are illustrated in the accompanying drawings, wherein like reference numerals refer to like elements throughout. In this regard, the examples may have different forms and should not be construed as being limited to the descriptions set forth herein. Accordingly, the examples are merely described below, by referring to the figures, to explain aspects. In the following description, well-known functions or constructions are not described in detail if it is determined that they would obscure the concept with unnecessary detail. It will be understood that, although the terms 'first', 'second', 'third,' etc., may be used herein to describe various elements, components, regions, layers and/or sections, these elements, components, regions, layers and/or sections should not be limited by these terms. These terms are only used to distinguish one element, component, region, layer or section from another region, layer or section.

As used herein, the term 'device' will be described in detail with reference to the accompanying drawings below. The terms "module" and "unit" are merely used to conveniently describe the examples and should not be understood to have different meanings or functions.

In the disclosure, examples of a device include, but are not limited to, fixed terminals such as a digital TV, a desktop computer, etc., and portable terminals such as a mobile phone, a smart phone, a tablet personal computer (PC), a laptop computer, a digital broadcasting terminal, a personal digital assistant (PDA), a portable multimedia player (PMP), a navigation device, etc. It will be apparent to those of ordinary skill in the art that the term "device" used herein may be understood to include various devices including a display.

It will be understood that when an element or layer is referred to as being 'connected to' another element or layer, the element or layer can be directly connected to another element or layer or can be electrically connected to another element or layer while intervening elements or layers are therebetween. It will be further understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Hereinafter, examples will be described with reference to the accompanying drawings.

FIG. 1 is a diagram illustrating an example communication established between a sink device and a source device.

The term "Wi-Fi Display (WFD)" may include, for example, a communication method whereby communication is established between devices based on a Wi-Fi Direct communication standard. The term "Wi-Fi Miracast" (hereinafter referred to as 'Miracast') is a technology whereby display devices may share a screen with each other using a wireless local area network (LAN) signal, based on Wi-Fi Direct.

According to an example, a source device may be a device that provides data and a sink device may be a device that receives the data. For example, a sink device may be a device that receives video data provided on a screen of a source device from the source device and displays the video data.

For example, the sink device may receive video data from the source device in a real-time streaming protocol (RTSP) manner. As illustrated in FIG. 1A, a sink device 100-2, e.g., a TV, may share a screen output from a source device 100-1, e.g., a TV, with the source device 100-1.

Figure 1B:
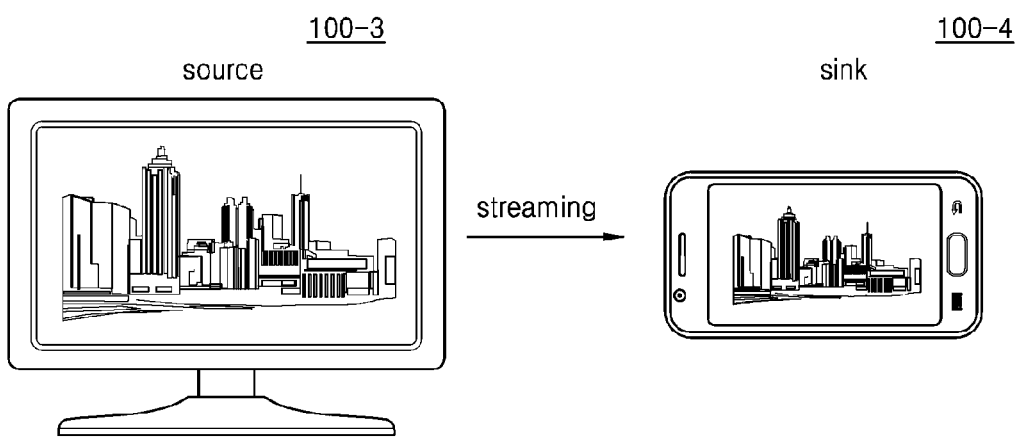
Figure 2:
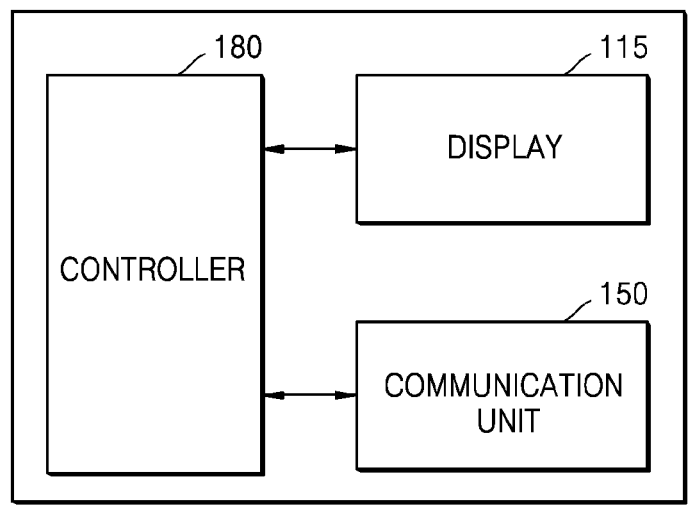
FIGS. 2 and 3 are block diagrams illustrating an example device.

In the disclosure, a sink device and a source device may be each substantially the same as a device 100 which includes a display 115 of FIG. 2. As illustrated in FIG. 1B, a source device 100-3 may be a TV and a sink device 100-4 may be a smart phone but the examples are not limited thereto.

According to an example, when a source device is a TV, external input sources of video data output from the source device may, for example, be a tuner unit, a high-definition multimedia interface (HDMI), a universal serial bus (USB), etc. Thus, when a source device is a TV, a sink device may receive video data from at least one among external input sources (e.g., a tuner unit, an HDMI, a USB, etc.) of the source device.

According to an example, a sink device may obtain information regarding external input sources provided by a source device during a WFD device discovery process for detecting the source device. Thus, a user of the sink device may select and receive information regarding a desired external input source among the external input sources of the source device to view desired video data more rapidly and conveniently.

The WFD device discovery process is a process of detecting peripheral devices to establish communication, i.e., a process of detecting a device supporting Wi-Fi Direct among a plurality of devices present around a device to connect devices. When a device supporting Wi-Fi Direct is present, information regarding the device may be received.

Figure 3:
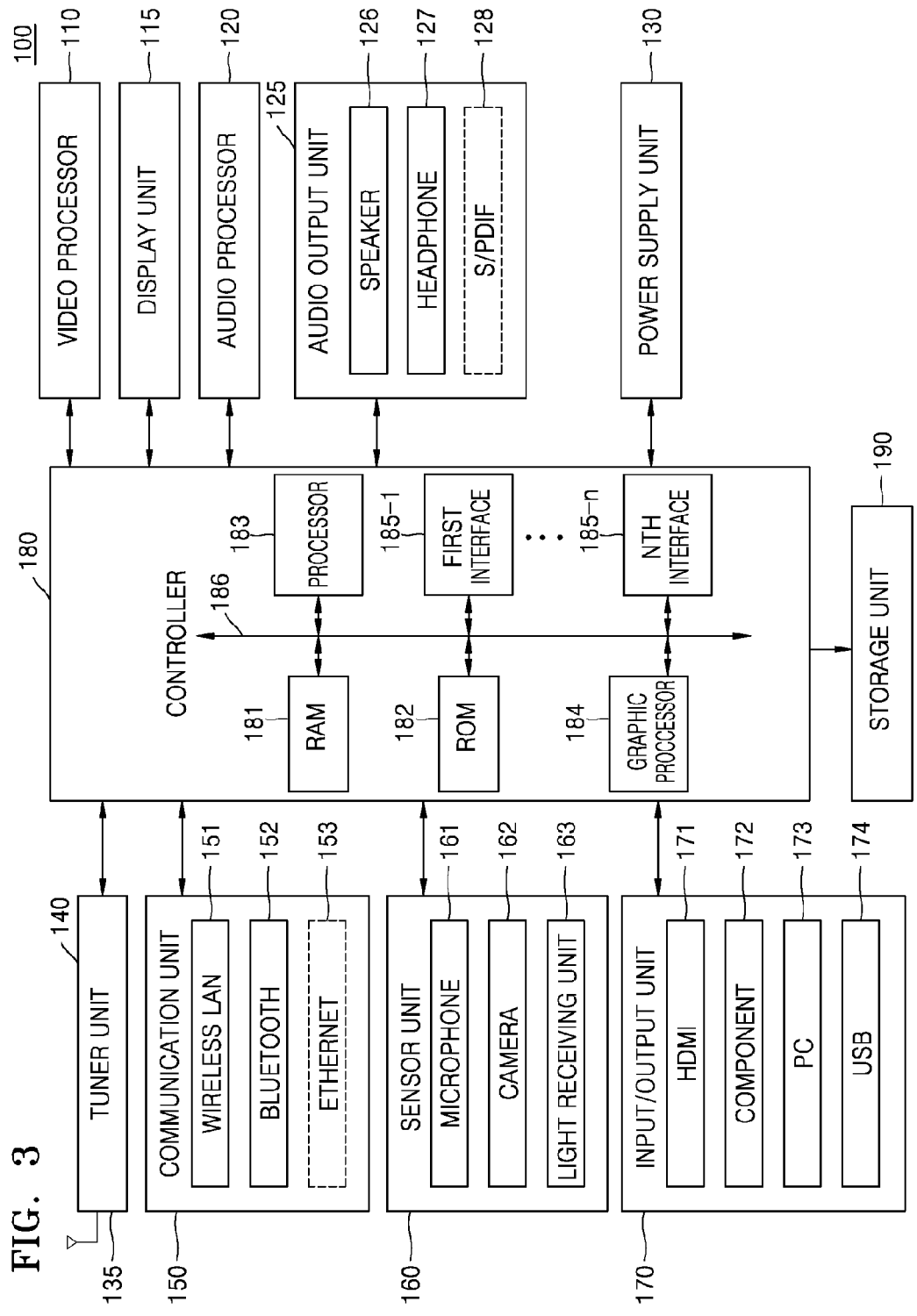

FIGS. 2 and 3 are block diagrams illustrating an example device 100.

Referring to FIG. 2, the device 100 may include the display 115, a controller 180, and a communication unit, in the form, for example, of communication circuitry 150. However, all of these elements are not indispensable elements. The device 100 may further include other elements and may include only some of these elements.

For example, as illustrated in FIG. 3, the device 100 may further include a video processor 110, an audio processor 120, an audio output unit 125, a power supply unit 130, a tuner unit 140, a sensor unit 160, an input/output (I/O) unit 170, and a storage unit 190.

These elements will now be described in greater detail below.

The video processor 110 processes video data received by the device 100. The video processor 110 may be configured to perform various image processing on the video data, e.g., decoding, scaling, noise filtering, frame rate conversion, resolution conversion, etc.

According to an example, when video data received from a source device is output to the display 115 of a sink device, the video processor 110 may process the video data by using a video processing module.

The display 115 displays video included in a broadcast signal received via the tuner unit 140 on a screen, under control of the controller 180. Also, the display 115 may display contents, e.g., moving pictures, which are input via the communication unit or circuitry 150 or the I/O unit 170. The display 115 may output an image stored in the storage unit 190 under control of the controller 180. Also, the display 115 may display a motion user interface (UI) (e.g., a voice command guide) for performing a voice recognition task corresponding to voice recognition or a motion UI (e.g., a user motion guide for motion recognition) for performing a motion recognition task corresponding to motion recognition.

According to an example, the display 115 may display information regarding at least one external input source of a source device, which is extracted from a probe response frame, under control of the controller 180, as will be described in detail with reference to FIGS. 8 and 9 below.

According to an example, the display 115 may display a UI requesting to input authentication information corresponding to an external input source of the source device under control of the controller 180, as will be described in detail with reference to FIGS. 9 and 10 below.

Also, according to an example, the display 115 may display information regarding at least one external input source of a sink device, under control of the controller 180.

The audio processor 120 processes audio data. The audio processor 120 may be configured to perform various processes on the audio data, e.g., decoding, amplification, noise filtering, etc. The audio processor 120 may include a plurality of audio processing modules to process audio corresponding to a plurality of contents.

The audio output unit 125 outputs audio included in a broadcast signal received via the tuner unit 140 under control of the controller 180. The audio output unit 125 may output audio input, e.g., voice, sound, etc., via the communication unit 150 or the I/O unit 170. Also, the audio output unit 125 may output audio stored in the storage unit 190 under control of the controller 180. The audio output unit 125 may include at least one among a speaker 126, a headphone output terminal 127, and a Sony/Philips Digital Interface (S/PDIF) output terminal 128. The audio output unit 125 may include a combination of the speaker 126, the headphone output terminal 127, and the S/PDIF output terminal 128.

The power supply unit 130 supplies power received from an external power source to the elements 110 to 190 of the device 100 under control of the controller 180. Also, the power supply unit 130 may supply power from at least one battery (not shown) included in the device 100 to the elements 110 to 190 of the device 100 under control of the control unit 180.

The tuner or tuner unit 140 may tune and select only a frequency of a channel from which the device 100 desires to receive data among a large number of radio wave components by amplifying, mixing, or resonating a broadcast signal received in a wire/wireless manner. The broadcast signal may, for example, include audio, video, and additional information such as an electronic program guide (EPG).

The tuner unit 140 may receive a broadcast signal at a frequency band corresponding to a channel number, e.g., a cable broadcasting number '506', according to a user input (e.g., a control signal received from the controller 180, such as channel number input, a channel up-down input, a channel input in an EPG screen, etc.).

The tuner unit 140 may receive a broadcast signal from various sources such as a terrestrial broadcast, a cable broadcast, a satellite broadcast, an Internet broadcast, etc. The tuner unit 140 may receive a broadcast signal from other sources such as an analog broadcast or a digital broadcast. Decoding (e.g., audio decoding, video decoding, or additional information decoding) is performed on a broadcast signal received via the tuner unit 140 to separate audio, video, and/or additional information from the broadcast signal. The separated audio, video, and/or additional information may be stored in the storage unit 190 under control of the controller 180.

The device 100 may include one or a plurality of tuner units 140. The tuner unit 140 may be integrally formed with the device 100 or may be embodied as a separate device including a tuner unit electrically connected to the device 100 (e.g., a set-top box (not shown) or a tuner unit (not shown) connected to the I/O output unit 170.

According to an example, tuner unit 140 may receive a broadcast signal and output the broadcast signal to the display 115 under control of the control unit 180

The communication unit or circuitry 150 may connect the device 100 to an external device such as an audio device, etc. under control of the controller 180. The controller 180 may be configured to transmit or receive contents to or from an external device connected to the device 100 via the communication unit 150, download an application from the external device, or perform web browsing, for example.

The communication unit 150 may include at least one among a wireless LAN unit 151, a Bluetooth unit 152, and a wired Ethernet unit 153 based on the performance and structure of the device 100. Otherwise, the communication unit 150 may include a combination of the wireless LAN unit 151, the Bluetooth unit 152, and the wired Ethernet unit 153.

The communication unit 150 may further include, but is not limited to, a Bluetooth Low Energy (BLE) communication unit, a near-field communication unit, a WLAN (Wi-Fi) communication unit, a ZigBee communication unit, an infrared data association ((IrDA) communication unit, a Wi-Fi Direct (WFD) communication unit, an ultra wideband (UWB) communication unit, an Ant+ communication unit, etc.

The communication unit 150 may exchange a radio signal with at least one among a base station, an external terminal, and a server in a mobile communication network. The radio signal may include a voice call signal, a video call signal, or various types of data generated when text/multimedia messages are exchanged.

Also, the communication unit 150 may include a broadcast receiving unit configured to receive a broadcast signal and/or broadcast-related information from the outside via a broadcast signal. The broadcast signal may include a satellite channel signal, a terrestrial wave channel signal, etc.

Also, the communication unit 150 may receive a control signal from an external control device under control of the controller 180. The control signal may be a Bluetooth type, a radio-frequency (RF) signal type, or a Wi-Fi type. According to an example, the communication unit 150 may communicate with an external device under control of the controller 180.

According to an example, the communication unit 150 of a sink device that receives video data may communicate with a source device under control of the controller 180. For example, the communication unit 150 of the sink device may transmit a probe request frame to the source device. Also, the communication unit 150 of the sink device may receive a probe response frame from the source device.

Also, the communication unit 150 of a source device that provides video data may communicate with a sink device under control of the controller 180. For example, the communication unit 150 of the source device may receive a probe request frame from the sink device. Also, the communication unit 150 of the source device may transmit a probe response frame containing information regarding an external input source of the source device to the sink device.

The sensor unit 160 senses, for example, a user's voice, image, or interaction.

A microphone 161 receives a user's voice. The microphone 161 may convert the received voice into an electrical signal and output the electrical signal to the controller 180.

The user's voice may include, for example, a voice command corresponding to a menu or a function of the device 100. A recognition range of the microphone 161 may be 4 meters or less from the microphone 161 to a user's location, and may vary depending on the intensity of a user's voice and an ambient environment (e.g., speaker sound, ambient noise, etc.).

The microphone 161 may be integrally formed with the device 100 or formed separately from the device 100. When the microphone 161 is formed separately from the device 100, the microphone 161 may be electrically connected to the device 100 via the communication unit 150 or the I/O unit 170.

It will be apparent to those of ordinary skill in the art that the microphone 161 may be omitted based on the performance and structure of the device 100.

Although not shown, a camera unit 162 may include a lens and an image sensor. The camera unit 162 may support optical zooming or digital zooming by using a plurality of lenses and image processing. A recognition range of the camera unit 162 may be variously set according to a camera angle and ambient environmental conditions. When the camera unit 162 includes a plurality of cameras, a three-dimensional (3D) still image or motion may be received using the plurality of cameras.

The camera unit 162 may be integrally formed with the device 100 or formed separately from the device 100. When the camera unit 162 is formed separately from the device 100, an additional device (not shown) that includes the camera unit 152 may be electrically connected to the device 100 via the communication unit 150 or the I/O unit 170.

It will be apparent to those of ordinary skill in the art that the camera unit 162 may be omitted based on the performance and structure of the device 100.

A light receiving unit 163 receives an optical signal (including, for example, a control signal) from an external control device via a light window of a bezel (not shown) of the display 115. The light receiving unit 163 may, for example, receive an optical signal corresponding to a user input (e.g., a touch, pressing, a touch gesture, voice, or a motion) from an external control device. A control signal may be extracted from the optical signal under control of the controller 180.

According to an example, the light receiving unit 163 may receive a user input for selecting information regarding one external input source among information regarding external input sources displayed on the display 115.

The I/O unit 170 receives video (e.g., moving pictures, etc), audio (e.g., voice, music, etc.), additional information (e.g., an EPG, etc.), etc. from outside the device 100 under control of the controller 180. The I/O unit 170 may include at least one among an HDMI port 171, a component jack 172, a PC port 173, and a USB port 174. Otherwise, the I/O unit 170 may include a combination of the HDMI port 171, the component jack 172, the PC port 173, and the USB port 174.

According to an example, the I/O unit 170 of the device 100 may receive video data from outside the device 100 and output the video data to the controller 180.

It will be apparent to those of ordinary skill in the art that the structure and operations of the I/O unit 170 may be embodied differently according various examples.

The controller 180 controls overall operations of the device 100 and the flow of a signal or signals between the elements 110 to 190 included in the device 100, and process data. When a user input is given or conditions that are set and stored beforehand are satisfied, the controller 180 may execute an operating system (OS) and various applications stored in the storage unit 190.

The controller 180 may include random access memory (RAM) 181 configured to store a signal or data input from outside the device 100 or to be used as a storage region corresponding to various works performed by the device 100, read-only memory (ROM) 182 configured to store a control program for controlling the device 100, and a processor 183.

The processor 183 may include a graphics processing unit (GPU) (not shown) configured to process graphics corresponding to video. The processor 183 may, for example, be embodied as a system-on-chip (SoC) in which a core (not shown) and a GPU (not shown) are combined with each other. The processor 183 may, for example, include a single core, two cores, three cores, four cores, or multiple cores.

Also, the processor 183 may, for example, include a plurality of processors. For example, the processor 183 may be a main processor (not shown), and a sub-processor operating in a sleep mode (not shown).

A graphics processor 184 creates a screen including various objects such as icons, images, texts, etc. by using an arithmetic unit (not shown) and a rendering unit (not shown). The arithmetic unit calculates attribute values such as the coordinates, size, colors, etc. of each object to be displayed according to the layout of a screen, based on a user interaction sensed by the sensor unit 160. The rendering unit creates screens having various layouts including objects, based on the attribute values calculated by the arithmetic unit. A screen generated by the rendering unit is displayed on a display region of the display 115.

First to $n^{th}$ interfaces 185-1 to 185-$n$ are connected to one of the above elements of the device 100. One of the first to $n^{th}$ interfaces 185-1 to 185-$n$ may, for example, function as a network interface connected to an external device via a network.

The RAM 181, the ROM 182, the processor 183, the graphics processor 184, and the first to $n^{th}$ interfaces 185-1 to 185-$n$ are connected to one another via an internal bus 186.

In the example, the term "control unit" or "controller" may be understood as including the processor 183, the ROM 182, and the RAM 181.

According to an example, the device 100 may act as a source device or a sink device based on a function of the controller 180. According to an example, the controller 180 of a source device may be configured to provide video data to a sink device. According to an example, the controller 180 of a sink device may be configured receive video data from a source device. According to an example, the controller 180 of a sink device may be configured transmit a probe request frame for detecting a source device via the communication unit 150.

Also, the controller 180 may be configured to receive a probe response frame from a source device receiving the probe request frame via the communication unit 150.

Also, the controller 180 may be configured to extract information regarding external input sources of a source device from the probe response frame.

Also, the controller 180 may be configured to display the extracted information regarding the external input sources on the display 115.

Also, the controller 180 may be configured to receive, via a user input unit (not shown), a user input for selecting information regarding one external input source among the information regarding the external input sources displayed on the display 115.

According to an example, the device 100 may further include a user input unit (not shown). The user input unit may, for example, include a unit via which a user input data for controlling the device 100 is received. Examples of the user input unit may include, but are not limited to, a key pad, a dome switch, a touch pad (a touch-type capacitive touch pad, a pressure-type resistive overlay touch pad, an infrared sensor-type touch pad, a surface acoustic wave conduction touch pad, an integration-type tension measurement touch pad, a piezo effect-type touch pad, etc.), a jog wheel, a jog switch, etc. The user input unit may include an external control device configured to transmit a control signal by using the communication unit 150 through wire/wireless communication. For example, the user input unit may be a mouse, a keyboard, a remote controller, etc.

Also, the controller 180 of a sink device may be configured to establish communication with a source device via the communication unit 150.

Also, the controller 180 of the sink device may be configured to transmit a control signal for receiving video data from an external input source, which is selected via the user input unit, to a source device via the communication unit 150.

Also, the controller 180 of the sink device may be configured to display a user interface requesting authentication information corresponding to the external input source on the display 115.

Also, the controller 180 of the sink device may be configured to display information regarding at least one external input source of the sink device on the display 115.

According to an example, the controller 180 of a source device may be configured to receive a probe request frame for detecting the source device via the communication unit 150.

Also, the controller 180 of the source device may be configured to transmit a probe response frame including information regarding at least one external input source of the source device to a sink device via the communication unit 150 in response to the probe request frame.

Also, the controller 180 of the source device may be configured to establish communication with a sink device via the communication unit 150.

Also, the controller 180 of the source device may be configured to receive a control signal regarding an external input source of a source device from a sink device via the communication unit 150.

Also, the controller 180 of the source device may be configured to transmit video data obtained from the external input source to a sink device via the communication unit 150, based on the control signal received from the sink device.

It will be apparent to those of ordinary skill in the art that the structure and operations of the controller 180 may be embodied differently according to various examples.

The storage unit 190 may store various data, programs, or applications for driving and controlling the device 100, under control of the controller 180. The storage unit 190 may store input/output signals or data corresponding to driving of the video processor 110, the display 115, the audio processor 120, the audio output unit 125, the power supply unit 130, the tuner unit 140, the communication unit 150, the sensor unit 160, and the I/O unit 170. The storage unit 190 may store a control program for controlling the device 100 and the controller 180, applications that have been provided from the manufacturing company of the device 1000, applications downloaded from the outside, a graphical user interface (GUI) related to the applications, objects providing the GUI (e.g., image texts, icons, buttons, etc.), user information, documents, databases, or data related thereto.

According to an example, the term "storage unit" may, for example, include the storage unit 190, the ROM 182 or the RAM 181 of the controller 180, a memory card (not shown) mounted in the device 100 (e.g., a micro secure digital (SD) card or a USB memory), etc. The storage unit 190 may, for example, also be understood to include a nonvolatile memory, a volatile memory, a hard disk drive (HDD), a solid state drive (SSD), etc.

Although not shown, the storage unit 190 may include a broadcast receiving module, a channel control module, a volume control module, a communication control module, a voice recognition module, a motion recognition module, a light receiving module, a display control module, an audio control module, an external input control module, a power control module, a power control module of an external device connected to the device 100 in a wireless manner (e.g., Bluetooth), a voice database (DB), a motion DB, etc. The above modules and the DBs of the storage unit 190 may be embodied in the form of software to perform, in the device 100, a broadcast receiving control function, a channel control function, a volume control function, a communication control function, a voice recognition function, a motion recognition function, a light-receiving control function, a display control function, an audio control function, an external input control function, a power control function, or a power control function of an external device connected to the device 100 in a wireless manner (e.g., Bluetooth). The control unit 180 may perform various functions using such software stored in the storage unit 190.

Also, the device 100 including the display 115 may be electrically connected to a separate external device including a tuner unit, e.g., a set-top box (not shown). It would be apparent to those of ordinary skill in the art that the device 100 may be, for example, (but is not limited to) an analog TV, a digital TV, a 3D-TV, a smart TV, a light-emitting diode (LED) TV, an organic LED (OLED) TV, a plasma TV, a monitor, etc.

Although not shown, the device 100 may include a sensor configured to sense an inner or outer state of the device 100 (e.g., an illuminance sensor, a temperature sensor, etc.).

The device 100 illustrated in FIG. 3 may further include at least another element or include only some of, for example, the elements 110 to 190 according to the performance of the device 100. Also, it will be apparent those of ordinary skill in the art that the locations of the elements of the device 100, e.g., the elements 110 to 190, may vary according to the performance or structure of the device 100.

Figure 4:
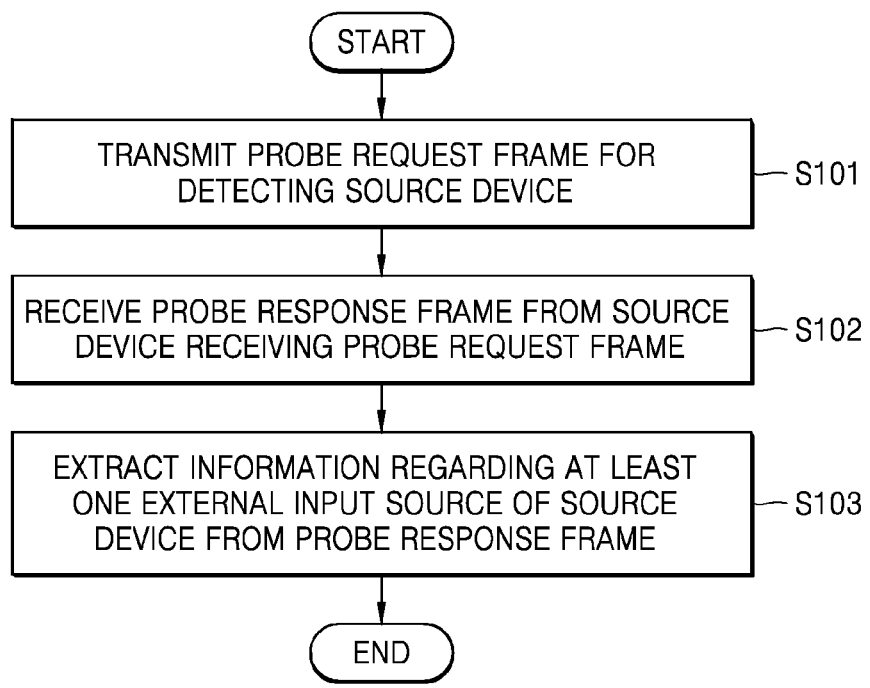
FIG. 4 is a flowchart illustrating an example process of establishing communication with a source device, performed by a sink device.
Figure 5:
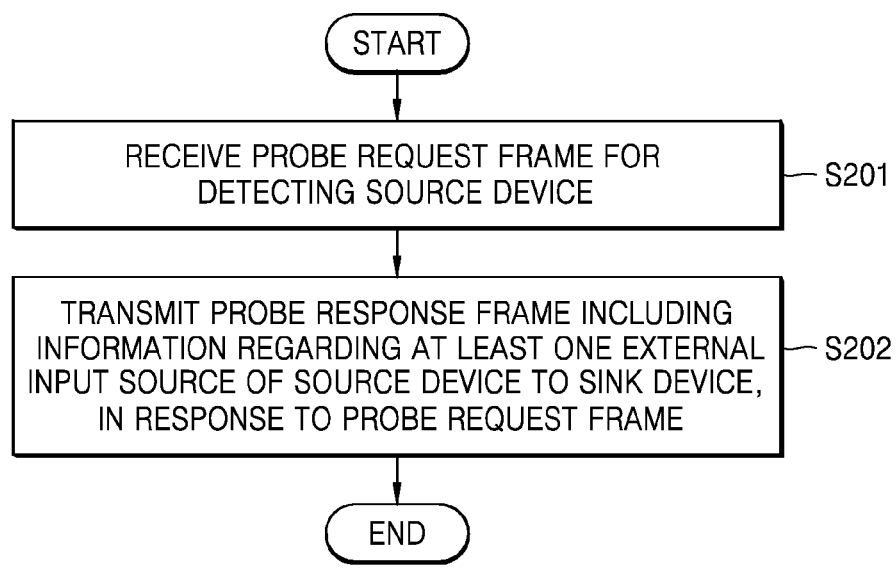
FIG. 5 is a flowchart illustrating an example process of establishing communication with a sink device, performed by a source device.
Figure 6:
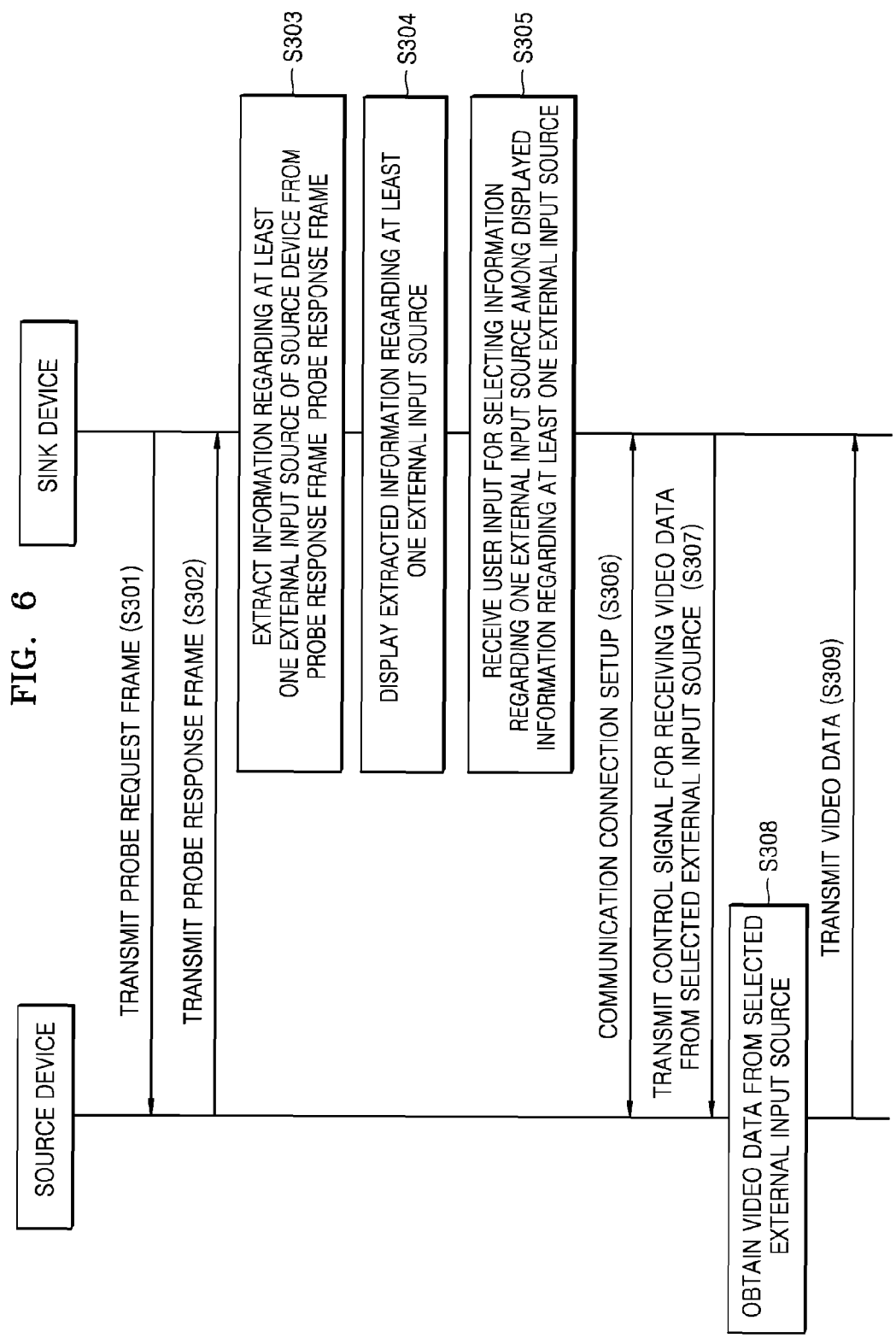
FIG. 6 is a flowchart illustrating an example process of establishing communication between a source device and a sink device.

FIG. 4 is a flowchart illustrating an example process of establishing communication with a source device, performed by a sink device. FIG. 5 is a flowchart illustrating an example process of establishing communication with a sink device, performed by a source device. FIG. 6 is a flowchart illustrating an example process of establishing communication between a source device and a sink device.

In operation S101 of FIG. 4 and operation S301 of FIG. 6, the controller 180 illustrated in FIG. 3 of a sink device may transmit a probe request frame for detecting a source device. In operation S201 of FIG. 5, the controller 180 of the source device may receive the probe request frame for detecting a source device via the communication unit 150.

These operations are included in a WFD device discovery process of detecting a source device that provides video data, which is performed by the sink device. The probe request frame transmitted from the sink device may include WFD information elements containing information regarding a device. For example, the WFD information elements may contain information indicating that the device supports Wi-Fi Direct and a Miracast communication manner. The WFD information elements will be described in detail with reference to FIG. 12 below.

In operation S102 of FIG. 4, the controller 180 of the sink device may receive a probe response frame from the source device receiving the probe request frame via the communication unit 150. In operation S202 of FIG. 5 and operation S302 of FIG. 6, the controller 180 of the source device receiving the probe request frame may transmit a probe response frame to the sink device via the communication unit 150, in response to the probe request frame. The probe response frame may contain information regarding at least one external input source of the source device. For example, the at least one external input source may include a tuner, a USB, and an HDMI.

According to an example, the source device receiving the probe request frame may insert, into the probe response frame, information regarding the at least one external input source that the source device may provide, and transmit the probe response frame to the sink device.

In operation S103 of FIG. 4 and operation S303 of FIG. 6, the control unit 180 of the sink device may extract the information regarding the at least one external input source of the source device from the probe response frame.

In operation S304 of FIG. 6, the controller 180 of the sink device may display the extracted information regarding the at least one external input source on the display 115.

According to an example, the sink device may check the information regarding the at least one external input source of the source device, which is included in the probe response frame received from the source device, during the WFD device discovery process.

In operation S305 of FIG. 6, the sink device may receive a user input for selecting one external input source based on the information regarding the at least one external input source displayed on the display 115. In operation S306 of FIG. 6, communication may be established between the sink device and the source device (WFD connection setup).

When the sink device receives the user input for selecting one external input source based on the information regarding the at least one external input source, the sink device establishes communication with the source device in a peer-to-peer manner.

In operation S307 of FIG. 6, the sink device may transmit a control signal for receiving video data from the external input source selected in operation S305 to the source device. For example, when the sink device (e.g., a TV) receives a user input for selecting a USB among the at least one external input source of the source device (e.g., a TV), the sink device may transmit a control signal for obtaining video data via the USB to the source device.

In operation S308 of FIG. 6, the source device may obtain video data from the external input source selected in operation S305, based on the control signal received in operation S307.

In operation S309 of FIG. 6, the source device may transmit the video data obtained in operation S308 to the sink device via the communication unit 150.

According to an example, the sink device may detect external input sources of the source device based on the probe response frame received during the WFD device discovery process, and receive video data from an external input source selected by a user by establishing communication with the source device according to a user input for selecting an external input source to be viewed.

Figure 7:
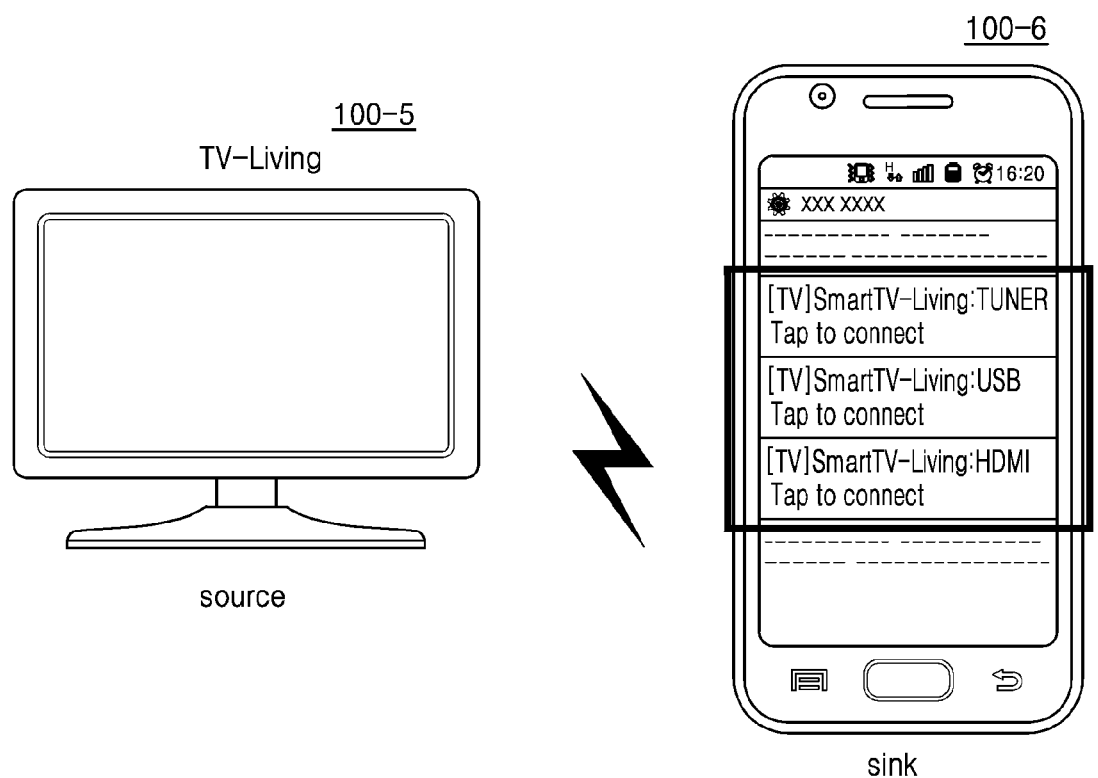
FIGS. 7 and 8 illustrate example cases in which a sink device displays information regarding external input sources of a source device.
Figure 8:
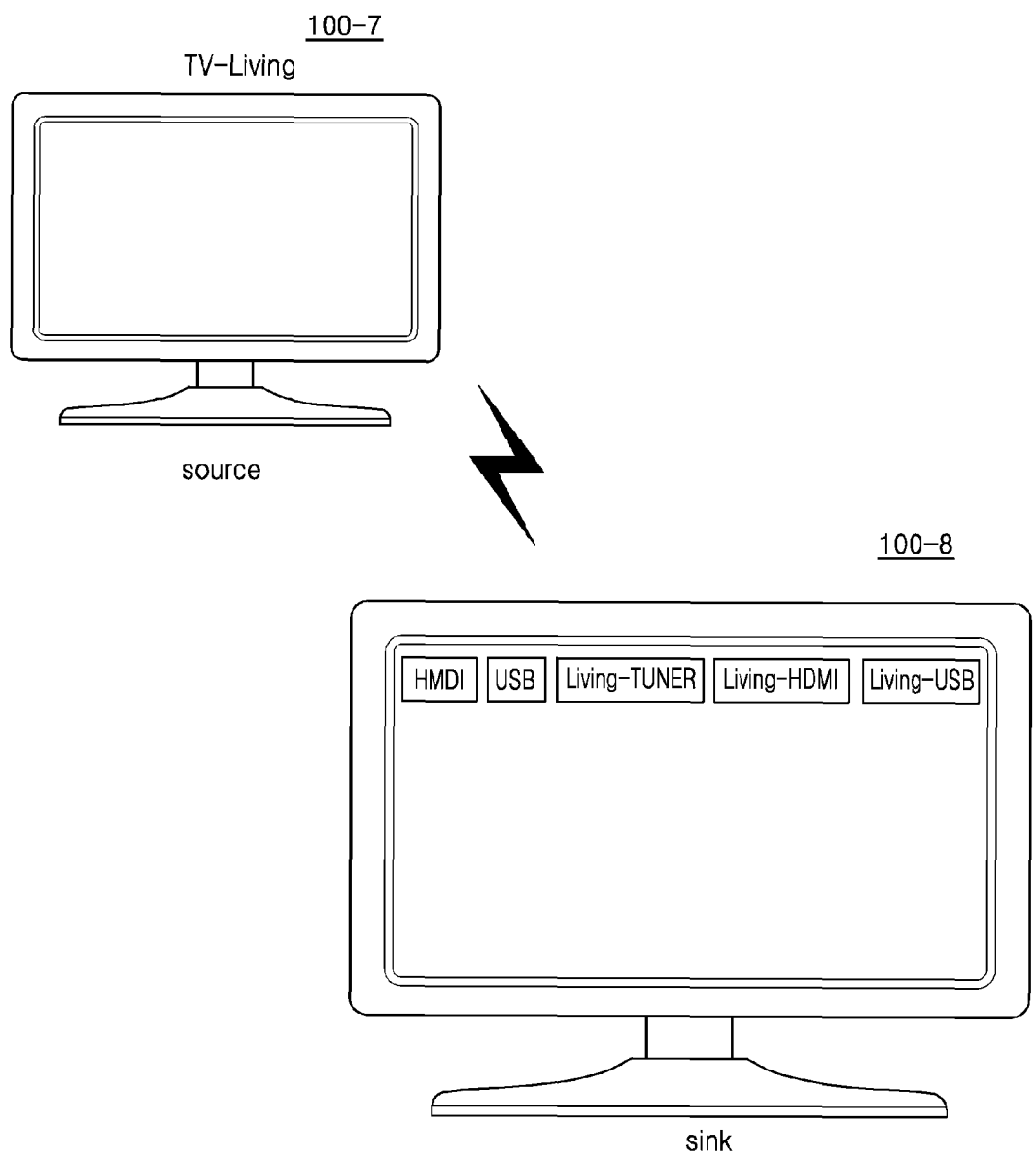

FIGS. 7 and 8 illustrate examples in which a sink device displays information regarding external input sources of a source device.

FIG. 7 illustrates casein example in which a source device 100-5 is a TV located in a living room and a sink device 100-6 is a smart phone. For example, a user of the smart phone 100-6 may detect other devices supporting Wi-Fi Direct in his/her home. The sink device 100-6 may display a list of the detected other devices supporting Wi-Fi Direct, e.g., "Smart TV-Living", on the display 115 of FIG. 3.

According to an example, the controller 180 illustrated in FIG. 3 of the sink device 100-6 may be configured to display information regarding external input sources of source devices on the display 115 when a list of the source devices is displayed. For example, a list of source devices and a list of external input sources that each of the source devices may provide (e.g., "Smart TV-Living: TUNER", "Smart TV-Living: USB", and "Smart TV-Living: HDMI") may be displayed on the display 115. This means that external input sources of the TV ("Smart TV-Living") located in the living room are a tuner, a USB, and an HDMI.

According to an example, when source devices that provide video data are detected, the sink device 100-6 may receive a list of the source devices and information regarding external input sources that each of the source devices may provide.

A user of the sink device 100-6 may view information regarding external input sources that detected source devices may provide while checking the detected source devices. Accordingly, the user may be more immediately and conveniently provided with desired video data.

FIG. 8 illustrates casein example in which a source device 100-7 is a TV located in a living room and a sink device 100-8 is a TV.

According to an example, the controller 180 illustrated in FIG. 3 of the sink device 100-6 may be configured to display information regarding external input sources of the source device 100-7, e.g., "Living-TUNER", "Living-HDMI", and "Living-USB", on the display 115 of FIG. 3. This information represents information (TV-Living) regarding the source device 100-7 detected by the sink device 100-8 and that external input sources of the source device 100-7 are an HDMI and a USB.

According to an example, the controller 180 of the sink device 100-8 may display information regarding at least one external input source thereof. For example, as illustrated in FIG. 8, when the sink device 100-8 is a TV, information representing the at least one external input source, e.g., an HDMI and a USB, of the TV, may be displayed on the display 115.

A user of the sink device 100-8 may check information regarding an external device that may provide video data, together with information regarding the at least one external input sources of the sink device 100-8. Accordingly, the user may be more immediately and conveniently provided with desired video data.

FIG. 8 illustrates casein example in which the information regarding the external input sources of the sink device 100-8 and the information regarding the external input sources of the source device 100-7 are displayed in the form of icons. However, the icons are merely an example of an interface according to various examples are not limited thereto. For example, the information regarding the external input sources of the sink device 100-8 and the information regarding the external input sources of the source device 100-7 may be displayed on the form of lists, the form of icons having different shapes, etc.

Figure 9:
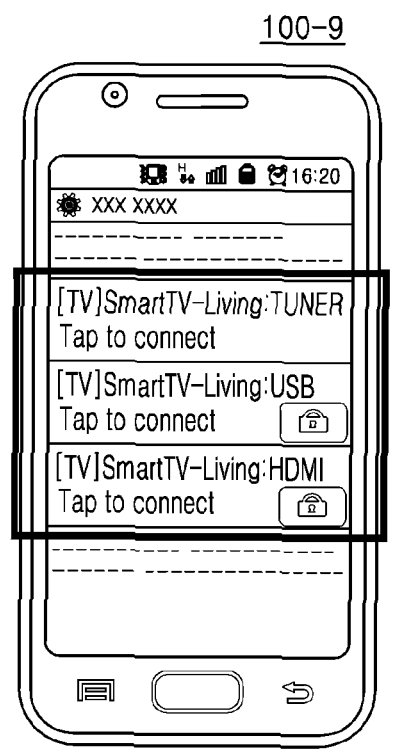
FIGS. 9 and 10 illustrate an example user interface requesting to input authentication information corresponding to an external input source.
Figure 10:
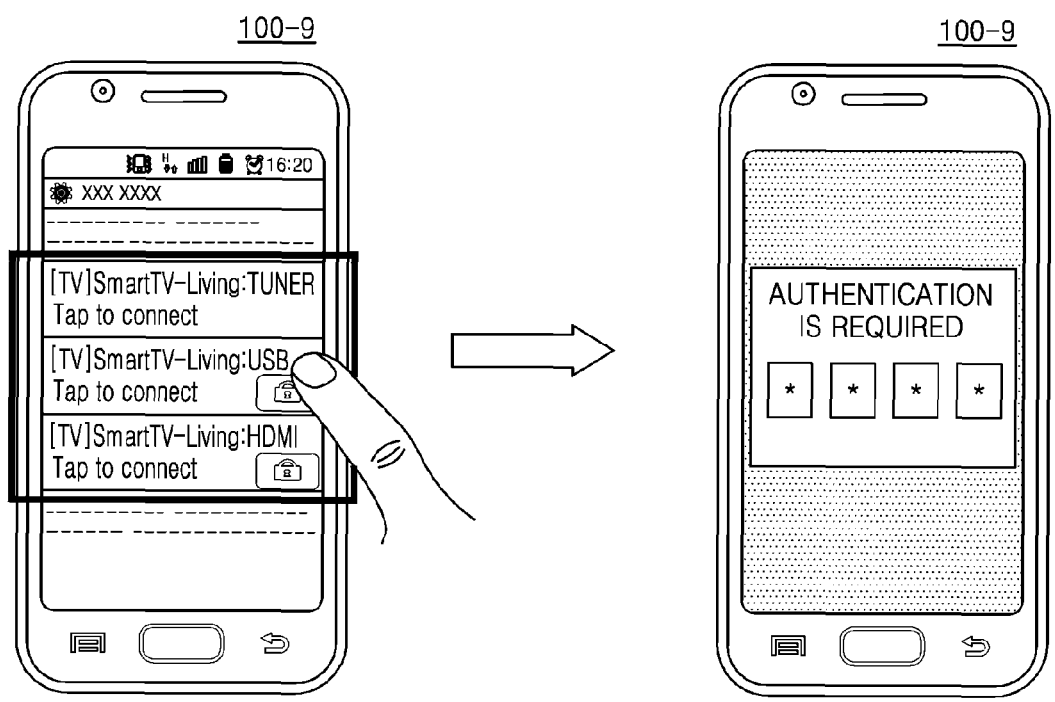

FIGS. 9 and 10 illustrate a user interface requesting input of authentication information corresponding to an external input source.

According to an example, a sink device 100-9 may display, on the display 115 of FIG. 3, the types of detected source devices and information regarding external input sources (e.g., a tuner, a USB, and an HDMI) that each of the detected source devices provide.

For example, each of the external input sources may request to perform a predetermined authentication process. Thus, the controller 180 illustrated in FIG. 3 of the sink device 100-9 may be configured to display icons representing that each of the external input sources of the detected source devices requests to perform a user authentication process on the display 115 (see FIG. 9).

For example, referring to FIG. 10, when the sink device 100-9 receives a user input signal for selecting an icon requesting to perform the user authentication process, the sink device 100-9 may display a popup window for inputting a password on the display 115.

The interfaces illustrated in FIG. 10 are merely examples of user interfaces via which the external input sources request user authentication information, and examples are not limited thereto.

FIG. 11 illustrates an example format of WFD sub-elements containing information regarding external input sources;

The term "WFD" includes a type of a communication method, whereby communication is established between devices based on a Wi-Fi Direct standard.

WFD information elements (IEs) represent a format of a frame containing basic information such as the types and states of devices. A probe request frame or a probe response frame is generated according to the format of the WFD IEs.

According to an example, WFD sub-elements of the WFD IEs may include information regarding external input sources provided from a source device.

Referring to FIG. 11, the WFD sub-elements may include a 'sub-element ID' field, a 'length' field, a 'number of sources' field, a 'source names body' field, etc. The sizes of the 'sub-element ID' field, the 'length' field, and the 'number of sources' field are respectively 1 octet, 2 octets, and 1 octet, and the size of the 'source names body' field is variable.

In the example, the 'sub-element ID' field corresponds to unique identifiers identifying vendors of the respective external input sources.

In the example, the 'length' field represents the whole length of the WFD sub-elements.

In the example, the 'number of sources' field includes information regarding the number of the external input sources that may be provided from the source device.

In the example, the 'source names body' field includes information regarding the types of the external input sources that may be provided from the source device.

Some of the WFD sub-elements may be omitted.

FIG. 12 illustrates an example format of WFD IEs.

The WFD IEs represent a format of a frame containing basic information of devices, e.g., the types and states of the device. A probe request frame or a probe response frame is generated according to the format of the WFD IEs.

Referring to FIG. 12, the WFD IEs include an 'element ID' field, a 'length' field, an 'organization unique identifier (OUI)' field, an 'OUI type' field, a 'WFD sub-elements' field, etc. The sizes of the 'element ID' field, the 'length' field, and the 'OUI' field, and the 'OUI type' field are respectively 1 octet, 1 octet, 3 octets, and 1 octet. The size of the 'WFD sub-elements' field is variable.

In the example, the 'element ID' field is a field that a vendor may use to create functions that are not defined in the IEEE 802.11 standard. The 'length' field represents the whole length of the WFD IEs.

In the example, the 'OUI' field corresponds to unique identifiers identifying vendors of the respective external input sources.

In the example, the 'OUI type' field represents the version of the WFD IEs.

In the example, the 'WFD sub-elements' field includes contents representing detailed information of the devices that are not described in the WFD IEs. The contents of the WFD sub-elements will be described in detail with reference to FIG. 13 below.

Some of the WFD IEs may be omitted.

FIG. 13 illustrates an example format of WFD sub-elements.

Referring to FIG. 13, the WFD sub-elements include a 'sub-element ID' field, a 'length' field, a 'sub-elements body' field, etc. The sizes of the 'sub-element ID' field and the 'length' field are respectively 1 octet and 2 octets, and the size of the 'sub-elements body' field is variable.

In the example, the 'sub-element ID' field represents the types of the WFD sub-elements, as will be described in detail with reference to FIG. 14 below.

In the example, the 'length' field represents the whole length of the WFD sub-elements.

In the example, of the 'sub-elements body' field represents detailed contents of the WFD sub-elements.

Some of the WFD sub-elements may be omitted.

FIG. 14 is an example table for explaining WFD sub-element identification (ID).

In the example, 'WFD device information' represents information regarding a WFD device, and 'Coupled Sink Information' represents whether the WFD device is connected to another device. The other sub-element IDs represent the performances of a codec and the device, address information, etc. which will be apparent to those of ordinary skill in the art, and are not described here in detail.

Some of the sub-element IDs may be omitted.

The above examples should be considered in descriptive sense only and not for purposes of limitation. Examples are not limited to the orders of the operations included in the flowcharts of FIGS. 4 to 6, and it will be apparent to those of ordinary skill in the art that some of the operations may be omitted, other operations may be further added, and the order of some of the operations may be changed.

Examples may be embodied in the form of a non-transitory computer-readable recording medium having recorded thereon computer-executable instructions, e.g., a program module that may be executed using a computer. Examples of the non-transitory computer-readable recording medium may include not only an arbitrary available recording medium that is accessible by a computer but also volatile/non-volatile recording media, and separable/non-separable recording media. Also, examples of the non-transitory computer-readable recording medium may include computer storage media and communication media. The computer storage media include volatile/non-volatile recording media and separable/non-separable recording media which are manufactured according to an arbitrary method or technology to store information such as computer-readable instructions, data structures, program modules or other data. The communication media generally include computer-readable instructions, data structures, program modules, other data of modulated data signals, other transmission mechanisms, and arbitrary information transfer media.

In the disclosure, the term "unit" may be understood to include a hardware component such as a processor or a circuit, and/or a software component performed by a hardware component such as a processor.

It should be understood that examples described herein should be considered in a descriptive sense only and not for purposes of limitation. Descriptions of feature points or aspects within each example should typically be considered as available for other similar feature points or aspects in other examples. It will be understood by those of ordinary skill in the art that various changes in form and details may be made therein without departing from the spirit and scope as defined by the following claims. For example, elements described as being included in a single unit may be dispersed. Similarly, elements described as being dispersed may be combined in a single unit.

While one or more examples have been described with reference to the figures, it will be understood by those of ordinary skill in the art that various changes in form and details may be made therein without departing from the spirit and scope as defined by the following claims.

What is claimed is:

1. A sink device for receiving video data from a source device, the sink device comprising:
   a display;
   communication circuitry configured to communicate with the source device; and
   a controller configured to:
   transmit a probe request frame for detecting the at least one source device,
   receive a probe response frame from the detected source device receiving the probe request frame via the communication circuitry,
   display information regarding the detected source device and information regarding at least one external input source of the source device on the display together, the information regarding at least one external input source being included in the probe response frame which is received in response to the probe request frame,
   receive an input to select one from among the detected source device and the at least one external input source of the detected source device, and
   when the at least one external input source of the detected source device is selected, control to establish communication with the detected source device and transmit a control signal for receiving video data from the selected external input source of the detected source device.

2. The sink device of claim 1, wherein the information regarding the at least one external input source of the source device is included in Wi-Fi display (WFD) information elements included in the probe response frame.

3. The sink device of claim 1,
   wherein the controller is configured to display, on the display, a user interface requesting to input authentication information corresponding to the at least one external input source.

4. The sink device of claim 1,
   wherein the controller is configured to display information regarding at least one external input source of the sink device on the display.

5. A method of receiving video data from a source device, performed by a sink device, comprising:
   transmitting a probe request frame for detecting at least one source device;

receiving a probe response frame from the detected source device receiving the probe request frame;

displaying information regarding the detected source device and information regarding at least one external input source of the source device on the display together, the information regarding at least one external input source being included in the probe response frame which is received in response to the probe request frame, receiving an input to select one from among the detected source device and the at least one external input source of the detected source device, and when the at least one external input source of the detected source device is selected, controlling to establish communication with the detected source device and transmit a control signal for receiving video data from the selected external input source of the detected source device.

6. The method of claim 5, wherein the information regarding the at least one external input source of the source device is included in Wi-Fi display (WFD) information elements included in the probe response frame.

7. The method of claim 5, further comprising displaying a user interface requesting to input authentication information corresponding to the at least one external input source.

8. The method of claim 5, further comprising displaying information regarding at least one external input source of the sink device.

\* \* \* \* \*